3,703,403
METHOD FOR MANUFACTURING SHEET
MATERIAL EXHIBITING A HIGHLY
GLOSSY SURFACE
Shigekazu Ohnishi, Masaharu Nishishita, and Hisateru Takimoto, Okayama, Japan, assignors to Kuraray Co., Ltd., Kurashiki City, Japan
No Drawing. Filed Sept. 14, 1970, Ser. No. 72,142
Claims priority, application Japan, Sept. 29, 1969, 44/77,555
Int. Cl. B44d 1/44
U.S. Cl. 117—64 C       13 Claims

ABSTRACT OF THE DISCLOSURE

A method is provided for producing sheet material exhibiting a high glossy surface comprising applying a layer of a polymer solution to a highly smooth-surfaced substrate, superimposing a porous sheet onto said layer of polymer solution, removing solvent from said layer of polymer solution through the porous sheet, thereby solidifying the polymer solution to form a non-porous polymeric layer to which said porous sheet is bonded, heat-setting the non-porous polymeric layer by heating said layer at a temperature ranging from about 10° C. to 50° C. below the melting point of the polymer, cooling the non-porous polymeric layer; and then stripping the non-porous polymeric layer to which the porous sheet is bonded from said smooth-surfaced substrate to recover a sheet material exhibiting a highly glossy surface.

---

The present invention relates to a method for producing sheet material exhibiting a highly glossy surface. More particularly, this invention relates to the preparatioon of artificial leather exhibiting a high gloss finish and a reduced tendency to curl.

Leathers finished with a glossy surface are well known. Generally, they are prepared by spraying a binary liquid type polyurethane paint onto the basic material to impart a glossy finish to the final product. This method, which is conventionally employed, results in inadequate bonding of the paint to the basic material and thus the final product exhibits inferior fatigue resistance.

It is an object of the present invention to provide a method for manufacturing sheet material exhibiting a high gloss finish wherein a strong bond is effected between a high-gloss polymeric layer and the basic sheet material and the fatigue resistance of the final product is excellent.

It is another object of the present invention to provide a method for manufacturing glossy sheet material which is substantially curl-free.

These as well as other objects are accomplished in accordance with the present invention which provides a method for producing sheet material exhibiting a highly glossy surface comprising:

(a) Applying a layer of polymer solution to a highly smooth-surfaced substrate;

(b) Superimposing a porous sheet on said layer of polymer solution;

(c) Removing the solvent from said layer of polymer solution through said porous sheet, thereby solidifying the polymer solution into a non-porous polymeric layer to which said porous sheet is bonded;

(d) Heat-setting the non-porous polymeric layer by heating the layer at a temperature from about 10° C. to about 50° C. lower than the melting point of the polymer;

(e) Cooling the non-porous polymeric layer; and (f) Stripping the non-porous polymeric layer to which the porous sheet is bonded from the highly smooth-surfaced substrate, thereby recovering a sheet material exhibiting a highly glossy surface.

The present invention enables the production of sheet material exhibiting a high gloss finish wherein a strong bond is effected between the high gloss polymeric layer and the basic sheet material. Moreover, the fatigue resistance of the final composite product is excellent.

Any highly smooth-surfaced substrate can be employed to impart the gloss-finish in accordance with the present invention. For example, metal plates, rolls and the like, as for example, iron plates or iron rolls having highly polished, glossy surfaces such as are provided by chrome plating can be employed. Preferably, these plates or rolls and the like having highly smooth surfaces are provided with means for introducing and circulating therein a medium for heating and cooling.

Any pliable polymer is suitable for use in the polymer solution employed in step (a) of the present invention. Polyurethane elastomers have been found to be especially suitable for use in the present invention. Polyurethane elastomers admixed with other polymers such as poly (vinyl chloride), polycarbonates and the like, said other polymers being employed in amounts less than about 50% by weight, can also be employed.

Any solvent which is capable of dissolving the polymer can be employed to form the polymer solution of step (a). Illustrative of suitable solvents are dimethylformamide, dimethylacetamide, dimethylsulfoxide, tetrahydrofuran, dioxane and the like. By selecting a solvent whose boiling point is optimum for use in the present invention, it is possible to use a single solvent; however, mixtures of solvents having different boiling points may also be used to maintain the evaporation rate of the solvent within a desired range. It is preferable that the solvent be a non-solvent to the materials which constitute the porous sheet to which the polymer will ultimately be bonded.

The concentration of the polymer within the polymer solution can range from about 10 to about 25% by weight. The viscosity of the polymer solution can range from about 1 to about 30 poises at 40° C. Insufficient concentration results in prolonged solvent removal thereby increasing the probability of devitrification and foaming. Excessive concentration of the polymer solution renders the uniform contacting thereof with the porous sheet difficult and results in poor bonding of the polymer solution with the porous sheet since the polymer solution then tends to dry too quickly. Insufficient viscosity of the polymer solution results in difficult coating thereof onto the highly smooth surfaced substrate which imparts the gloss finish to the product, while excessive viscosity renders uniform coating difficult and results in inadequate bonding with the porous sheet.

Best results in the final product are achieved when the thickness of the polymeric layer remaining on the porous sheet after drying is between about 10 to about 50 microns.

Although not considered necessary, various additives such as pigments, plasticizers and the like can be added to the polymer solution, if desired.

The porous sheet to which the glass finish is applied in accordance with the present invention can be any material exhibiting a porous structure having continuous pores. Otherwise, removal of the solvent from the polymer solution which has been applied to the highly smooth surfaced substrate becomes difficult after the porous sheet is superimposed thereon. As a result, production of sheet material exhibiting a superior gloss finish will be hindered.

The base material forming the porous sheet of the present invention can comprise a fibrous base which is impregnated and/or coated with a solution or emulsion of polymers and which is then treated with a liquid containing a non-solvent for said polymer so that the polymer coagulates to form a porous structure inside and/or on the surface of said fibrous base.

The fibrous base for the porous sheet can be any fibrous material such as natural fibers, for example, cotton, chemical fibers, for example, viscose rayon and acetate rayon, synthetic fibers, for example, nylon, polyesters, poly (vinyl chloride), polyacrylonitrile, polypropylene, polyvinylalcohol and the like; mixed-spun fibers comprising polyamide (or polyester) and polystyrene; and woven, knitted or non-woven fabric made of a mixture of said fibers, especially non-woven fabric comprising layers of random webs of synthetic fibers or the like being needle-punched. Any woven, knitted or non-woven fabric which can be impregnated with a solution or an emulsion of polymer and which can be treated with a liquid non-solvent for the polymer and the fibers constituting said fabric so that the impregnated polymer can be coagulated to form a porous structure can be suitably employed.

Illustrative of the polymers which can be suitably employed to impregnate and/or coat the woven, knitted or non-woven materials described hereinabove to form porous structures for use in the present invention are, for example, polyurethane elastomers, polyamides, poly (vinyl chloride) and the like. Polyurethane elastomers are particularly suitable for producing a porous sheet that is superior in fatigue resistance.

Polyurethane elastomers which are useful in the present invention can be prepared by reacting a polyester, polyether or polyether-ester having hydroxyl groups at both ends of the molecule and a molecular weight of over 500, an organic diisocyanate and chain extender, such as, diamine, diol and hydrazine. These polyurethane elastomers are soluble in such solvents as dimethylformamide, diethylformamide, dimethylacetamide, dimethylsulfoxide, dioxane and the like.

Water, methyl alcohol, ethylene glycol and the like or a mixture of water and a solvent for the polymer such as an aqueous solution of dimethylformamide can be used as the non-solvent medium to effect coagulation of the fibrous base in the preparation of the porous sheet of the present invention.

The porous sheet employed in step (b) of the present invention exhibits a smooth, even surface. Although a gloss finish can be imparted to the final product even if the surface of the porous sheet is not substantially perfectly smooth, if the surface is extremely uneven, the material will fail to yield satisfying results and will detract from the appearance of the final product.

Once the porous sheet is superimposed upon the polymer solution coated upon the highly smooth surfaced substrate, removal of solvent from the polymer solution is commenced. Solvent removal is conducted at a temperature at least about 10° C. lower than the boiling point of the solvent or of the solvent having the lowest boiling point when a mixture of solvents is employed. It has been found that if the temperature exceeds this limit, the solvent is caused to rapidly evaporate. With rapid evaporation, however, the solvent is unable to completely escape from the porous sheet resulting in formation of foam which interferes with the formation of a superior gloss finish. Conversely, a low drying temperature, although it in no way affects the quality of the product, is considered undesirable in that it requires too long a drying period. From a commercial standpoint, it is considered preferable to conduct the drying at the highest temperature which will not cause foaming. Preferably, the temperature is gradually raised as the drying proceeds. It is often possible to raise the temperature above the boiling point of the solvent when the amount of residual solvent becomes less than the amount of polymer present.

Artificial leather having a high gloss finish can be obtained by stripping the non-porous polymeric layer to which the porous sheet is bonded from the highly smooth surfaced substrate to impart a high gloss finish thereto immediately after drying; however, the product obtained in this manner tends to curl toward the gloss-finished side. It has been found in accordance with the present invention that this curling tendency can be obviated by heat-setting the polymeric layer after it is solidified. It is considered preferable to conduct this heat-setting during step (d) of the present invention by heating for a period of from about 0.5 to about 10 minutes at a temperature of from about 10° C. to about 50° C. lower than the melting point of the polymer. It is considered more effective to conduct this heat-setting while the drying operation is still incomplete and thus a small amount of residual solvent is still present. Heating at a temperature above said range and continuing said heating for a long period results in deterioration of the porous sheet thereby impairing the smoothness of the surface and the flexibility thereof. Moreover, the resulting non-porous polymeric layer and the highly smooth surfaced substrate become adhered to each other making it difficult to strip off the final product. If, however, the temperature or the duration of heating is less than the lower limit of the range set forth above, no appreciable improvement in preventing curling is obtained.

It has been found necessary to maintain the temperature at the time of stripping the non-porous polymeric layer to which the porous sheet is bonded from the highly smooth surfaced substrate to a temperature below about 80° C. The high gloss finish of the product will be impaired at a higher temperature and the value of the final product as a highly glossy sheet material may be reduced.

Resistance to stripping of the final product from the smooth-surfaced substrate is greater in a sheet which has been heat treated to prevent curling in addition to drying as compared to a sheet which has not undergone such additional heat treatment. If desired, bonding inhibitor or lubricant can be used to facilitate stripping. Most conventional bonding inhibitors can be suitably used herein. For example, higher alcohols, esters, silicon resins and natural waxes with high melting points are considered suitable. The bonding inhibitor or lubricant can be added to the polymer solution in amounts ranging from about 0.1 to about 10% by weight of the polymer. If desired, a small amount of bonding inhibitor can be employed to uniformly precoat the highly smooth-surfaced substrate prior to use.

The present invention will be further illustrated by the following example. All percentages and parts are by weight unless otherwise specified.

EXAMPLE 1

Three layers of random web comprising nylon-6 fiber of 1.5 denier and 50 millimeters in cut-length are needle-punched to provide a non-woven fabric. The non-woven fabric is impregnated with dimethylformamide solution containing 18% by weight of polyurethane elastomer. The polyurethane elastomer is prepared by reacting polyethylene propylene adipate glycol having a molecular weight of approximately 2,000 (the mole ratio of ethylene and propylene being 9:1), 4,4'-diphenylmethane diisocyanate and ethylene glycol in a molar ratio of 1:5:4.

Thereafter, the impregnated fabric is contacted with a pressing roller which adjusts the amount of polymer solution contained in the fabric to 4.6 times the weight of the fabric. The non-woven fabric is then coated with a dimethylformamide solution containing 24% by weight of a polyurethane elastomer having the same chemical structure as given hereinabove in an amount of 150 grams per square meter (when converted into the amount of polyurethane elastomer). The resulting non-woven fabric is then immersed in a 50% by weight aqueous solution of dimethylformamide maintained at 50° C. thereby coagulating the polyurethane elastomer which has been coated and impregnated therein to form a porous structure in the intervals of the fibers and on the surface of the non-woven fabric. The fabric is then rinsed with water to remove the residual dimethylformamide and then dried to provide a porous sheet for use in accordance with the present invention.

A metal roller having a highly polished smooth surface adapted to impart a high gloss finish is coated with a solution to a thickness of 0.1 millimeter, said solution containing 20% by weight of a polyurethane elastomer, 1% by weight of polyethylene glycol having a molecular weight of 6,000, 75% by weight of tetrahydrofuran and 4% by weight of dimethylformamide.

The porous sheet prepared as described above is superimposed upon the solution applied to the roller so as to uniformly contact the surface of the porous sheet with the polymer solution. The temperature of the roll is raised from 40° C. to 70° C. in 5 minutes to evaporate a substantial portion of the solvent and solidify the solution into a non-porous polymeric layer to which the porous sheet is firmly bonded. The polymeric layer on the roll is heat-set for an additional 2 minutes at a 150° C. After this subsequent heating, the polymeric layer to which the porous sheet is bonded is cooled to 40° C. and stripped from the roll. Artificial leather with a high gloss finish is produced exhibiting superior dimensional stability and having no tendency to curl toward the glossy side.

What is claimed is:

1. A method for producing leather-like sheet material exhibiting a highly glossy surface comprising:
   (a) applying a layer of a polymer solution to a highly smooth-surfaced substrate;
   (b) superimposing a porous sheet onto said layer of polymer solution;
   (c) removing solvent from said layer of polymer solution through the porous sheet, thereby solidifying the polymer solution to form a non-porous polymeric layer to which said porous sheet is bonded;
   (d) heat-setting the non-porous polymeric layer while in contract with said highly smooth-surfaced substrate at a temperature ranging from about 10° C. to about 50° C. below the melting point of the polymer;
   (e) cooling the non-porous polymeric layer while in contact with said highly smooth-surfaced substrate to a temperature below about 80° C.; and
   (f) stripping the non-porous polymeric layer to which the porous sheet is bonded from said smooth-surfaced substrate to recover a sheet material exhibiting a highly glossy surface.

2. A method for producing leather-like sheet material exhibiting a highly glossy surface comprising:
   (a) applying a layer of polyurethane solution to a highly smooth-surfaced substrate in sufficient thickness to yield a film thickness of from between about 10 to about 50 microns upon removal of the solvent;
   (b) superimposing onto said layer of polyurethane solution a fibrous porous sheet which is formed by impregnating and/or coating a non-woven fabric with a coagulable polymer solution and coagulating the coagulable polymer solution;
   (c) removing the solvent from said layer of polyurethane solution through the fibrous porous sheet to solidify the polyurethane solution and form a non-porous polyurethane layer having a thickness between about 10 to about 50 microns which is bonded to said fibrous porous sheet;
   (d) heat-setting the non-porous polyurethane layer while in contact with said highly smooth-surfaced substrate at a temperature ranging from about 10° C. to about 50° C. below the melting point of the polyurethane in said non-porous polyurethane layer;
   (e) cooling the non-porous polyurethane layer to a temperature below about 80° C. while in contact with said highly smooth-surfaced substrate; and
   (f) stripping the non-porous polyurethane layer and the attached fibrous porous sheet from said smooth-surfaced substrate to recover a leather-like sheet material having a highly glossy surface.

3. A method as defined in claim 2 wherein the solvent in step (a) is non-solvent to the materials which constitute the fibrous porous sheet in step (b).

4. A method as defined in claim 2 wherein the polyurethane in the polyurethane solution is admixed with polyvinyl chloride or polycarbonate.

5. A method as defined in claim 2 wherein the coagulation of the coagulable polymer solution in step (b) is effected by treating the polymer solution with a liquid containing a non-solvent for the polymer.

6. A method as defined in claim 2 wherein the polymer of the coagulable polymer solution in step (b) is polyurethane, polyamide or polyvinylchloride.

7. A method as defined in claim 2 wherein the solvent removal in step (c) is conducted at a temperature at least 10° C. lower than the boiling point of the solvent or of the solvent having the lowest boiling point when a mixture of solvents is employed.

8. A method as defined in claim 2 wherein the non-porous polyurethane layer is heat-set for a period of time ranging from about 0.5 to about 10 minutes.

9. A method as defined in claim 2 wherein heating of said polyurethane layer is commenced during step (c).

10. A method as defined in claim 2 wherein the concentration of polyurethane in the polyurethane solution ranges from about 10 to about 25% by weight of the solution.

11. A method as defined in claim 2 wherein the viscosity of the polyurethane solution ranges from about 1 to 30 poises at 40° C.

12. A method as defined in claim 2 wherein the polyurethane solution additionally contains from about 0.1 to about 10% by weight of polymer of a bonding inhibitor or lubricant.

13. A method as defined in claim 2 wherein the smooth-surfaced substrate is uniformly pretreated with a bonding inhibitor or lubricant.

References Cited

UNITED STATES PATENTS

| 3,077,398 | 2/1963 | Jones | 117—64 C |
| 3,539,424 | 11/1970 | Tashlick | 156—247 |
| 3,113,887 | 12/1963 | Wiebush | 117—64 C |

FOREIGN PATENTS

| 883,931 | 12/1961 | Great Britain | 117—64 C |

MURRAY KATZ, Primary Examiner

U.S. Cl. X.R.

117—138.8 N, F, UA, 145

UNITED STATES PATENT OFFICE
CERTIFICATE OF CORRECTION

Patent No. 3,703,403                    Dated November 21, 1972

Inventor(s) Shigekazu Ohnishi et al

It is certified that error appears in the above-identified patent and that said Letters Patent are hereby corrected as shown below:

Column 1, line 35, "preparatioon" should be --preparation--.

Column 2, line 38, "poises" should be --poise--.

Column 3, line 39, insert --polymer solution impregnated and/or coated on the-- after "the" (second occurrence).

Signed and sealed this 29th day of May 1973.

(SEAL)
Attest:

EDWARD M. FLETCHER, JR.
Attesting Officer

ROBERT GOTTSCHALK
Commissioner of Patents